United States Patent
Denis (10) Patent No.: US 10,987,748 B2
(45) Date of Patent: *Apr. 27, 2021

(54) ELECTRIC ARC START SYSTEMS AND METHODS

(71) Applicant: Illinois Tool Works Inc., Glenview, IL (US)

(72) Inventor: Marc Lee Denis, Lena, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 209 days.

This patent is subject to a terminal disclaimer.

(21) Appl. No.: 16/134,709

(22) Filed: Sep. 18, 2018

(65) Prior Publication Data

US 2019/0084067 A1 Mar. 21, 2019

Related U.S. Application Data

(63) Continuation of application No. 14/957,930, filed on Dec. 3, 2015, now Pat. No. 10,076,802.

(Continued)

(51) Int. Cl.
*B23K 9/067* (2006.01)
*B23K 9/167* (2006.01)

(52) U.S. Cl.
CPC .......... *B23K 9/067* (2013.01); *B23K 9/0673* (2013.01); *B23K 9/167* (2013.01)

(58) Field of Classification Search
CPC ....... B23K 9/067; B23K 9/0673; B23K 9/167

(Continued)

(56) References Cited

U.S. PATENT DOCUMENTS 3,281,047 A * 10/1966 Weicht .................. B23K 9/028
228/7
3,594,540 A * 7/1971 Weinfurt ............. B23K 9/1274
219/105

(Continued)

FOREIGN PATENT DOCUMENTS

CN 2360203 * 1/2000 ............... B23K 9/09
CN 201371305 12/2009

(Continued)

OTHER PUBLICATIONS

International Search Report from PCT application No. PCT/US2015/064031, dated Apr. 13, 2016, 11 pgs.

*Primary Examiner* — Eric S Stapleton
(74) *Attorney, Agent, or Firm* — McAndrews, Held & Malloy, Ltd.

(57) ABSTRACT

A system and methods for electrically starting an arc in a welding process are disclosed. The system and methods may reduce an electromagnetic interference (EMI) footprint during the arc start by reducing the average power spectral density output and broadening the frequency spectrum of the arc EMI footprint. In one embodiment, a welding system may include a welding torch and a welding power source electrically coupled to the welding torch via a weld cable configured to supply electrical energy to the welding torch. The welding power source may include pseudo-random noise (PRN) generator control logic circuitry configured to generate a dithered pulse waveform with a pseudo-randomly selected data sequence of binary values based on one or more baselines, and to apply the dithered pulse waveform to an oscillator during arc starting in a tungsten inert gas (TIG) welding process performed by the welding torch.

15 Claims, 2 Drawing Sheets

Related U.S. Application Data (60) Provisional application No. 62/094,563, filed on Dec. 19, 2014.

(58) Field of Classification Search
USPC .................................................. 219/130.4
See application file for complete search history.

(56) References Cited

U.S. PATENT DOCUMENTS

| | | | | |
|---|---|---|---|---|
| 3,609,289 A * | 9/1971 | Hathaway | ............... | B23K 9/126 |
| | | | | 219/124.1 |
| 3,651,290 A * | 3/1972 | Durbin | ................. | H01H 35/027 |
| | | | | 200/61.45 R |
| 3,656,734 A * | 4/1972 | Davis | ..................... | B23K 7/006 |
| | | | | 266/55 |
| 3,747,829 A * | 7/1973 | Hofmeister | ....... | H01L 21/67144 |
| | | | | 228/29 |
| 4,163,886 A * | 8/1979 | Omae | ................... | B23K 9/0953 |
| | | | | 219/125.11 |
| 4,188,583 A * | 2/1980 | McCurdy | ............ | H03M 1/0629 |
| | | | | 331/78 |
| 4,288,020 A * | 9/1981 | Searles | ................ | B23K 9/1274 |
| | | | | 219/124.34 |
| 4,289,950 A * | 9/1981 | Griebeler | ............. | B23K 9/0213 |
| | | | | 219/124.34 |
| 4,388,655 A * | 6/1983 | Zenzefilis | ............. | G11B 5/012 |
| | | | | 360/21 |
| 4,931,018 A * | 6/1990 | Herbst | .................... | G09B 19/24 |
| | | | | 345/10 |
| 5,117,088 A * | 5/1992 | Stava | .................... | B23K 9/0673 |
| | | | | 219/130.4 |
| 5,440,937 A * | 8/1995 | Lynnworth | ............. | G01F 1/662 |
| | | | | 73/861.25 |
| 5,844,193 A * | 12/1998 | Nomura | ................. | B23K 11/24 |
| | | | | 219/110 |
| 6,079,666 A * | 6/2000 | Hornback | ............. | F41G 7/2213 |
| | | | | 244/3.15 |
| 6,248,976 B1 * | 6/2001 | Blankenship | ........ | B23K 9/0953 |
| | | | | 219/130.21 |
| 6,368,276 B1 * | 4/2002 | Bullis | ...................... | A61B 8/00 |
| | | | | 600/437 |
| 6,988,026 B2 * | 1/2006 | Breed | ..................... | G07C 5/008 |
| | | | | 701/31.4 |
| 7,103,460 B1 * | 9/2006 | Breed | ................. | B60C 23/0408 |
| | | | | 701/29.1 |
| 7,227,476 B1 * | 6/2007 | Wong | ...................... | H03M 5/08 |
| | | | | 341/53 |
| 7,525,455 B2 * | 4/2009 | Norsworthy | ............ | H04B 1/04 |
| | | | | 341/161 |
| 7,554,372 B1 * | 6/2009 | Wong | .................... | H02M 3/157 |
| | | | | 327/172 |
| 7,791,387 B1 * | 9/2010 | Wong | ....................... | H03K 7/08 |
| | | | | 327/172 |
| 7,899,096 B1 * | 3/2011 | Bhatia | .................. | G02B 6/4225 |
| | | | | 359/326 |
| 7,962,967 B2 * | 6/2011 | Becker | ...................... | A61F 9/06 |
| | | | | 2/8.1 |
| 8,408,445 B1 * | 4/2013 | Cai | ........................ | B23K 20/26 |
| | | | | 156/73.5 |
| 8,621,539 B1 * | 12/2013 | Monk | .................. | H04L 12/2801 |
| | | | | 725/111 |
| 8,664,564 B2 * | 3/2014 | Vogel | ...................... | H02M 1/12 |
| | | | | 219/130.1 |
| 8,747,116 B2 * | 6/2014 | Zboray | .................. | G09B 19/24 |
| | | | | 219/130.21 |
| 8,834,168 B2 * | 9/2014 | Peters | ..................... | G09B 5/02 |
| | | | | 434/219 |
| 8,851,896 B2 * | 10/2014 | Wallace | ................... | G09B 5/00 |
| | | | | 434/234 |
| 8,911,237 B2 * | 12/2014 | Postlethwaite | ........ | G09B 19/24 |
| | | | | 434/219 |
| 8,915,740 B2 * | 12/2014 | Zboray | ................. | G09B 19/24 |
| | | | | 156/64 |
| 9,011,154 B2 * | 4/2015 | Kindig | ................... | G09B 19/24 |
| | | | | 434/234 |
| 9,262,794 B2 * | 2/2016 | Zhao | ...................... | G06T 1/0021 |
| 10,076,802 B2 * | 9/2018 | Denis | ..................... | B23K 9/167 |
| 2004/0040945 A1 * | 3/2004 | Morimoto | ........... | B23K 9/0953 |
| | | | | 219/130.51 |
| 2004/0130442 A1 * | 7/2004 | Breed | ...................... | G02B 27/01 |
| | | | | 340/443 |
| 2005/0192727 A1 * | 9/2005 | Shostak | ................. | B60C 23/041 |
| | | | | 701/37 |
| 2005/0230372 A1 * | 10/2005 | Ott | ....................... | B23K 9/1087 |
| | | | | 219/132 |
| 2005/0273218 A1 * | 12/2005 | Breed | ..................... | B60R 21/20 |
| | | | | 701/2 |
| 2006/0025897 A1 * | 2/2006 | Shostak | ................. | G08G 1/017 |
| | | | | 701/1 |
| 2006/0030897 A1 * | 2/2006 | Gilmer | ............... | A61N 1/36025 |
| | | | | 607/45 |
| 2007/0161904 A1 * | 7/2007 | Urbano | .................. | A61B 8/565 |
| | | | | 600/459 |
| 2007/0187378 A1 * | 8/2007 | Karakas | ................. | B23K 9/095 |
| | | | | 219/130.21 |
| 2008/0110261 A1 * | 5/2008 | Randall | ................. | G01S 7/5208 |
| | | | | 73/592 |
| 2008/0110263 A1 * | 5/2008 | Klessel | ............... | G01S 7/52085 |
| | | | | 73/602 |
| 2008/0110266 A1 * | 5/2008 | Randall | ................ | A61B 8/4472 |
| | | | | 73/661 |
| 2008/0112265 A1 * | 5/2008 | Urbano | ................ | A61B 8/4494 |
| | | | | 367/87 |
| 2008/0114239 A1 * | 5/2008 | Randall | ................ | A61B 8/4438 |
| | | | | 600/437 |
| 2008/0114241 A1 * | 5/2008 | Randall | ................. | A61B 8/565 |
| | | | | 600/443 |
| 2008/0114245 A1 * | 5/2008 | Randall | ................. | A61B 8/56 |
| | | | | 600/447 |
| 2008/0114246 A1 * | 5/2008 | Randall | ................ | A61B 8/4438 |
| | | | | 600/447 |
| 2008/0114247 A1 * | 5/2008 | Urbano | .................. | A61B 8/56 |
| | | | | 600/447 |
| 2008/0114248 A1 * | 5/2008 | Urbano | ................ | A61B 8/4438 |
| | | | | 600/447 |
| 2008/0114249 A1 * | 5/2008 | Randall | ............... | G01S 7/52082 |
| | | | | 600/447 |
| 2008/0114252 A1 * | 5/2008 | Randall | ................ | A61B 8/4472 |
| | | | | 600/447 |
| 2008/0114253 A1 * | 5/2008 | Randall | ................. | G01S 7/5208 |
| | | | | 600/459 |
| 2008/0114255 A1 * | 5/2008 | Schwartz | ............. | A61B 8/4483 |
| | | | | 600/474 |
| 2008/0314887 A1 * | 12/2008 | Stoger | .................. | B23K 9/1276 |
| | | | | 219/137 R |
| 2009/0298024 A1 * | 12/2009 | Batzler | .................... | B23K 9/32 |
| | | | | 434/234 |
| 2010/0224610 A1 * | 9/2010 | Wallace | ............... | B23K 9/0953 |
| | | | | 219/137 R |
| 2010/0286514 A1 * | 11/2010 | Leighton | ............... | G01S 15/108 |
| | | | | 600/437 |
| 2010/0286527 A1 * | 11/2010 | Cannon | .................... | A61B 8/56 |
| | | | | 600/459 |
| 2010/0314362 A1 * | 12/2010 | Albrecht | ................. | B23K 28/02 |
| | | | | 219/121.63 |
| 2011/0316516 A1 * | 12/2011 | Schiefermuller | ......... | A61F 9/06 |
| | | | | 323/318 |
| 2012/0057240 A1 * | 3/2012 | Sundell | ................... | A61F 9/067 |
| | | | | 359/601 |
| 2012/0067859 A1 * | 3/2012 | Albrecht | ................. | B23K 9/125 |
| | | | | 219/137 R |
| 2012/0068978 A1 * | 3/2012 | Aitken | ................. | G09G 3/3406 |
| | | | | 345/207 |
| 2012/0141002 A1 * | 6/2012 | Urbano | .................. | G01S 7/5205 |
| | | | | 382/131 |
| 2012/0273473 A1 * | 11/2012 | Zhang | ..................... | B23K 9/091 |
| | | | | 219/130.31 |

(56) References Cited

U.S. PATENT DOCUMENTS

| | | | | |
|---|---|---|---|---|
| 2013/0081293 A1* | 4/2013 | Delin | ............... | B23K 37/0205 |
| | | | | 33/301 |
| 2013/0208569 A1* | 8/2013 | Pfeifer | ................ | G01S 17/58 |
| | | | | 367/129 |
| 2014/0109675 A1* | 4/2014 | Langlois | ............ | G01N 29/343 |
| | | | | 73/596 |
| 2015/0053660 A1* | 2/2015 | Schartner | ............. | H02M 3/285 |
| | | | | 219/130.1 |
| 2015/0060426 A1* | 3/2015 | Schartner | ............. | B23K 9/173 |
| | | | | 219/130.21 |
| 2015/0146805 A1* | 5/2015 | Terry | ................ | H04L 5/0007 |
| | | | | 375/260 |

FOREIGN PATENT DOCUMENTS

| | | | | |
|---|---|---|---|---|
| CN | 101682251 | * | 3/2010 | ............ H02M 1/12 |
| CN | 202028854 | * | 11/2011 | ............ B23K 9/067 |
| CN | 102398100 | | 4/2012 | |
| CN | 202591804 | * | 12/2012 | ............ B23K 9/067 |
| CN | 102922091 | | 2/2013 | |
| JP | 2014155945 | | 8/2014 | |

\* cited by examiner

ELECTRIC ARC START SYSTEMS AND METHODS

CROSS-REFERENCE TO RELATED APPLICATIONS

This application is a continuation of U.S. application Ser. No. 14/957,930 filed Dec. 3, 2015, now U.S. Pat. No. 10,076,802, which claims priority from and the benefit of U.S. Provisional Application Ser. No. 62/094,563, entitled "ELECTRIC ARC START SYSTEM AND METHOD," filed Dec. 19, 2014, which is hereby incorporated by reference in its entirety for all purposes.

BACKGROUND

The present disclosure relates generally to welding systems, and, more particularly, to starting an arc of certain processes used in the welding systems.

Some welding systems use arc welding processes, such as gas tungsten arc welding (GTAW), also known as tungsten inert gas (TIG) welding, where a non-consumable tungsten electrode is used to produce a weld. Welding systems that use the TIG welding process may start an arc in several ways, including directly or remotely. Directly starting the arc may be referred to as a "scratch start." To scratch start the arc, the tungsten electrode is scratched against the work with the power on to strike the arc. However, contamination of the weld and the electrode may occur using scratch starting. Remotely starting the arc may be referred to as a "high frequency (HF) start." While no contact between the tungsten electrode and work is made, HF starting the arc may require a relatively high voltage high frequency sinusoidal waveform (a few MHz) to be applied to the tungsten electrode. The high frequency electric field generated at the tip of the electrode breaks down the dielectric resistance of the path between the electrode tip and the work piece within the column of shielding gas so as to form a conductive path in the shielding gas so that the arc can be established. Unfortunately, due to the large output voltage that facilitates the start, HF waveform arc starts typically create a relatively large electromagnetic interference (EMI) footprint, which may cause problems for nearby electronics, among other things.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a welding system may include a welding torch and a welding power source electrically coupled to the welding torch via a weld cable configured to supply electrical energy to the welding torch. The welding power source may include pseudo-random noise (PRN) generator control logic circuitry configured to generate a dithered pulse waveform with a pseudo-randomly selected data sequence of binary values based on one or more baselines, and to apply the dithered pulse waveform to an oscillator during arc starting in a tungsten inert gas (TIG) welding process performed by the welding torch.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As previously noted, using high frequency (HF) waveforms to initiate the arc in TIG welding systems may generate a relatively large electromagnetic interference (EMI) footprint that is undesirable for nearby electronics. Accordingly, the present disclosure relates to reducing the EMI footprint produced when electrically starting an arc in TIG welding systems using enhanced control circuitry and low cost components, among other things. In some embodiments, the enhanced control circuitry, may use a hybrid combination of pulse width modulation (PWM) and pulse position modulation (PPM) techniques to generate a dithering pulse waveform. Any type of 'pulse' modulation is a sub-class of Amplitude Modulation in which any change in the output waveform is a change in amplitude, in the Pulse Modulation case, the amplitude varies from "on" to "off". The dithering pulse waveform may reduce the average power spectral density output during a start by the act of spreading the spectrum of frequencies used by the arc start signal. As described in detail below, the enhanced control circuitry may achieve PWM by using baselines related to the minimum time an oscillator needs to be on to initiate the arc and a maximum time the oscillator can be off before the arc extinguishes. Other modulation schemes are also applicable to this disclosure. For example, the PRN subcircuitry could alter, or modulate, either the oscillator phase or frequency. Advantages of these modes is that the power in the HS Start Waveform is more constant (not pulsing on and off) while still spreading the spectrum.

The enhanced control circuitry may use pseudo-random noise (PRN) generator control logic to randomly generate pulse widths in accordance with the baselines to reduce the average power spectral density. Also, the enhanced control circuitry may dither the pulse position using PPM to broaden the frequency spectrum used to reduce the EMI footprint during arc starts. Further, in an embodiment, the control circuitry may monitor the system using the baselines to determine the performance of the system and/or whether the electrode is configured properly, among other things.

Figure 1:
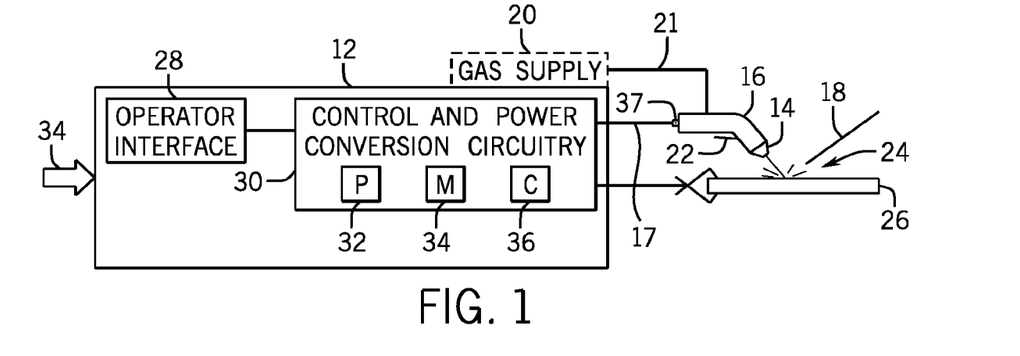
FIG. 1 is a block diagram of a TIG welding system including a power source and a non-consumable tungsten electrode, in accordance with an embodiment of the present disclosure.

Turning now to the drawings, and referring first to FIG. 1, an exemplary TIG welding system 10 is illustrated as including a power source 12 and a non-consumable tungsten electrode 14. The power source 12 may be electrically coupled and supply weld power to a torch 16 via a weld cable 17. An operator may hold the torch 16 in one hand and manually feed a filler rod 18 into a weld area. A gas supply 20, which may be integral with or separate from the power source 12, supplies a gas (e.g., $CO_2$, argon) to the torch 16 either via the weld cable 17 or through a separate cable 21 as illustrated. An operator may engage a trigger 22 of the torch 16 to initiate an arc 24 between the tungsten electrode 14 and a work piece 26. In some embodiments, the welding system 10 may be triggered by an automation interface, including, but not limited to, a programmable logic controller (PLC) or robot controller. In some embodiments, electromagnetic interference (EMI) that often accompanies remote arc starts may be reduced by using pulse width modulation (PWM) in conjunction with pulse position modulation (PPM), among other things, to generate a dithered pulse waveform used during starting. That is, the disclosed techniques may maintain the peak arc power to start the arc 24 while reducing the average power spectral density that is output, as described in more detail below. The welding system 10 is designed to provide weld power and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the type of start (e.g., dithering pulse waveform, HF, lift-start, etc.), weld process (e.g., TIG, stick, etc.), voltage and current settings, and so forth. The weld settings are communicated to control and power conversion circuitry 30 within the power source 12.

The control and power conversion circuitry 30 operates to control generation of welding power output that is applied to the electrode 14 for carrying out the desired welding operation. That is, the control and power conversion circuitry 30 controls the current and/or the voltage of the weld power supplied to the torch 16. In certain embodiments, the control and power conversion circuitry 30 may include one or more processors 32 that execute computer instructions or access data stored on one or more tangible, non-transitory computer-readable media (e.g., memory 34). In some embodiments, the control and power conversion circuitry 30 may include a subcircuitry 36 adapted to regulate a pulse used to start the arc 24 between the electrode 14 and the work piece 26 in a TIG welding regime. The subcircuitry 36 may include pseudo-random noise (PRN) generator control logic 38, among other things, and the subcircuitry 36 may be realized by processor 32, which may be any suitable processor, such as a microcontroller. Using the PRN generator control logic 38, a dithered pulse waveform may be generated that uses a hybrid combination of PWM and PPM techniques to apply to an oscillator 39. According to an aspect, the oscillator 39 may be a crystal oscillator where the operational frequency is known. In some embodiments, any suitable oscillator 39 may be used, such as a resistor-capacitor (RC) oscillator or inductor-capacitor (LC) oscillator. As described in detail below, the average pulse width of the dithered pulse waveform applied to the oscillator 39 affects the average power spectral density of the output while the dithering pulse position causes a spread spectrum effect. In other words, the average power is reduced while broadening the frequency spectrum of the EMI footprint produced when starting arcs 24 between the electrode 14 and the work piece 26.

When determining the dithered pulse train, the subcircuitry 36 may obtain baselines of the minimum on time of the oscillator 39 needed to start the arc 24 between the electrode 14 and the work piece 26 and the maximum off time of the oscillator 39 before the arc extinguishes. In some embodiments, the baselines may be preset and stored in the memory 34 of the power source. Additionally or alternatively, the baselines may be determined at a desired time, such as the first time the arc 24 is started, by the subcircuitry 36 measuring the oscillator collector/drain current required to start an arc 24 given referenced variables (type of gas, electrode size and tip pointing, etc.). For example, in some embodiments, the subcircuitry 36 may time, for a referenced value of oscillator collector/drain current, how long the oscillator 39 is on to start the arc 24 and setting the minimum on time baseline to that length of time and timing how long the oscillator 39 is off before the arc 24 extinguishes and setting the maximum off time baseline to that length of time. The widths of pulses may be randomly generated by activating and deactivating the oscillator based on the baselines to reduce the average power density. Further, in some embodiments, the processor 32 may monitor the system 10 to determine whether the electrode 14 is properly configured and/or whether the system 10 needs maintenance based at least in part on the actual on time needed to start the arc 24 and/or the actual length of off time before the arc extinguishes.

The control and power conversion circuitry 30 supplies the weld power (e.g., dithered pulsed waveform) that is applied to the electrode 14 at the torch 16. The circuitry 30 is coupled to a source of electrical power as indicated by arrow 34. The power 34 applied to the circuitry 30 may originate in the power grid, although other sources of power may also be used, such as power generated by an engine-driven generator, batteries, fuel cells or other alternative sources. Power conversion components of the circuitry 30 may include choppers, boost converters, buck converters, inverters, and so forth. In some embodiments, components of the subcircuitry 36 may include an amplifier 40 and a transformer 42, which are described in more detail below.

In some embodiments, the circuitry 30 may monitor the performance of the system 10 and the configuration of the electrode 14 using one or more sensors 37. The sensors 37 may be any suitable type of sensor, including thermal, current, vibration, and so forth. The data fed back to the circuitry 30 may form a closed loop system, and the circuitry 30 may use the data to determine various characteristics and configurations of the system 10. For example, if a sensor 37 returns data indicating that the arc 24 took longer than the minimum on time baseline for a referenced value of oscillator collector/drain current, then the circuitry 30 may determine that the electrode 14 is not configured properly (e.g., positioned incorrectly) and preventative actions may be executed. The preventative actions may include generating an audio and/or visual alert via the operator interface 28. Further, if the arc 24 extinguishes quicker or shorter than the maximum off time baseline after turning off the power source 12, then the processor 32 may determine that the electrode 14 is improperly configured. In some embodiments, the current in the amplifier 40 of the subcircuitry 36 may be monitored to surmise the quality of the electrode 14. For example, if more than a threshold amount of current is needed to start the arc 24, then the processor 32 may determine that the quality of the electrode 14 has degraded and generate an alert via the operator interface 28.

Figure 2:
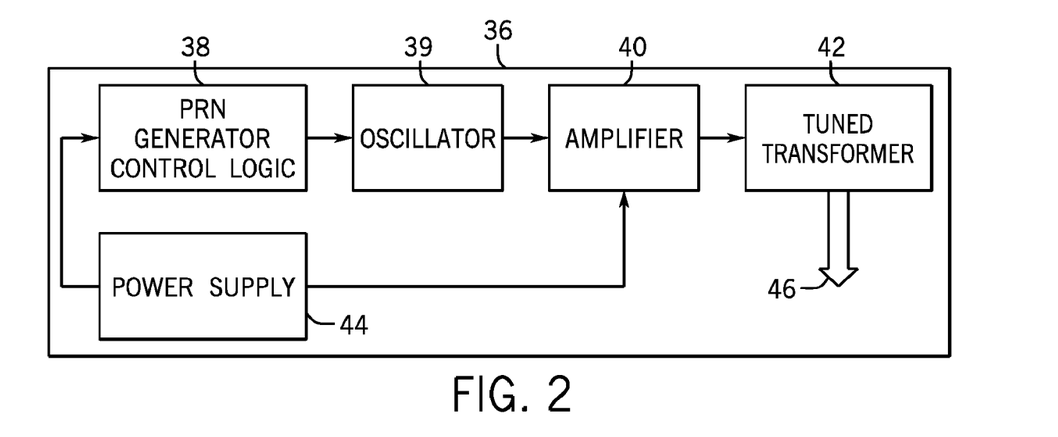
FIG. 2 is a block diagram of subcircuitry used to start an arc in the TIG welding system of FIG. 1, in accordance with an embodiment of the present disclosure.

FIG. 2 is a block diagram of subcircuitry 36 used to start an arc in the TIG welding system 10 of FIG. 1, in accordance with an embodiment of the present disclosure. As depicted, in certain embodiments, the subcircuitry 36 may include four elements: PRN generator control logic 38, an oscillator 39, an amplifier 40, a transformer 42, and a power supply subsystem 44. The PRN generator control logic 38 may be implemented in hardware and/or software. That is, the PRN generator control logic 38 may be implemented as a circuit, such as a field-programmable gate array (FPGA), or as computer-instructions (program) stored in one or more tangible, non-transitory processor-readable media and executed by a microprocessor or microcontroller, or the like. As previously noted, the PRN generator control logic 38 is configured to generate a dithered pulse train to apply to the oscillator 39 to provide regulated power to start the arc 24 with a reduced EMI footprint. In certain embodiments, the oscillator 39 may be part of the PRN generator control logic 38. The EMI may be reduced by spreading the spectrum of frequencies used by the output signal and reducing the average power output. Spreading the spectrum of frequencies may be enabled by varying the temporal positions of pulses (e.g., via PPM) in accordance with characteristics of the modulating signal and reducing the average power may be enabled by varying the widths of the pulses (e.g., via PWM). To achieve these aspects, the PRN generator 38 may generate a pseudo-random data sequence of binary values (logical 1's and 0's) to apply to a state variable of the oscillator 39. The state variable of the oscillator 39 is either on (1) or off (0). The PRN generator control logic 38 may obtain baselines for the minimum time the oscillator 39 needs to be on to initiate the arc 24 and the maximum time the oscillator 39 may be off before the arc 24 extinguishes.

In some embodiments, the baselines may be preprogrammed and obtained from the memory 34. Additionally or alternatively, the baselines may be obtained upon activation of the power source 12 by determining, for a referenced value of oscillator collector/drain current, how long the oscillator 39 was on to start the arc 24 (e.g., based on data returned by sensors 37) and then turning off the oscillator 39 and determining how long it takes for the arc 24 to extinguish. The determined baselines may be stored in the memory 34 for later access. In any embodiment, once the baselines are obtained, the PRN generator control logic 38 may generate random values in between the minimum and maximum values. That is, the minimum on time and maximum off time may establish a range of times to which the intermediate values may be set. Thus, the data sequence generated is pseudo-random because the initial values (logical 1's) for starting the arc 24 are determined based on the minimum on time baseline and the final values (logical 0's) for extinguishing the arc 24 are determined based on the maximum off time baseline, while the values in between are determined randomly according to the baselines. For example, the PRN generator control logic 38 may choose a data sequence such that the oscillator 39 stays on long enough to get the arc 24 started and not off long enough so that the arc 24 extinguishes. It should be noted that the generation of the data sequence to apply to the oscillator's state variable may be based on the duty cycle. By randomly setting the length of times the oscillator 39 is on and off in between the minimum on time and maximum off time, the widths of the pulses are varied (PWM) and the positions of the pulses are varied (PPM), thereby reducing the average power spectral density (EMI footprint).

In certain embodiments, the amplifier 40 may be a radiofrequency RF amplifier and embody a high efficiency topology, such as class F, but any suitable class may be used, such as class A, AB, B, C, D, E, F, etc. In certain embodiments, the amplifier 40 may include class C, D, E, F, or any other amplifier topology which offers improvement in efficiency as compared to a class A amplifier. The high efficiency topology promotes lower power rating and lower cost to manufacture. For example, using the high efficiency amplifier 40 may enable using lower power components, such as low voltage metal-oxide-semiconductor field-effect transistors (MOSFETs). Also, the amplifier 40 may be non-tuned, which facilitates the generation of broad band signals used to achieve the EMI spread spectrum effect. That is, being non-tuned may mean the amplifier 40 is not tuned to output signals at a particular frequency. As a result, the non-tuned feature of the amplifier 40 may enable the amplifier 40 to output signals at different frequencies in the frequency spectrum. The amplifier 40 may receive low voltage signals as input and output signals with higher voltages. In addition, the power supply subsystem 44 may provide filtered power to the PRN generator control logic 38 and the amplifier 40 for the subcircuitry 36.

As may be appreciated by those skilled in the art, Q may refer to quality factor and the higher the Q, the narrower the bandwidth, and the lower the Q, the broader the bandwidth. Thus, the transformer 42 may be low Q tuned to achieve broad band operation while providing frequency filtering. For example, in certain embodiments, the transformer 42 may have a Q of approximately 1.0 (e.g., greater than approximately 0.5 and/or less than approximately 4.0). A shunt capacitor may be used on the transformer 42 primary winding, which in combination with parasitic elements, enables the low Q tuned characteristic of the transformer 42. The transformer 42 may output the power to the torch 16, represented by arrow 46. Using the broad band RF amplifier 40 with the low Q tuned transformer on the output stage enables a lower voltage rating on the circuitry 30, while still outputting voltage high enough to start the arc 24.

Figure 3:
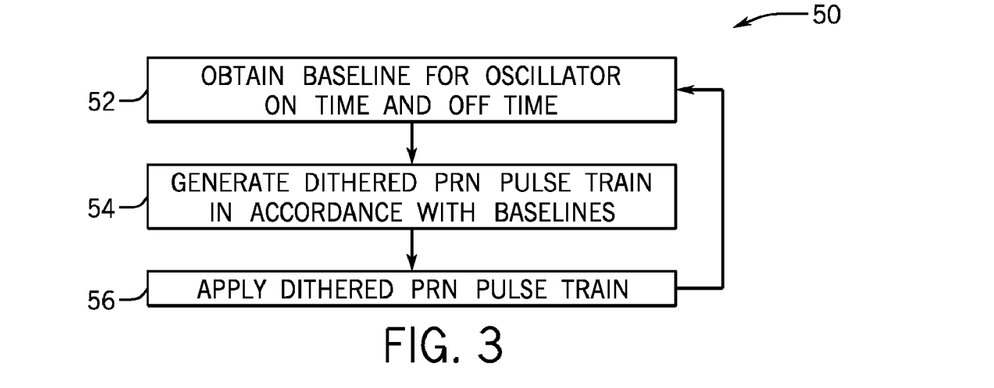
FIG. 3 is a flow diagram of a process suitable for starting an arc in the TIG welding system of FIG. 1, in accordance with an embodiment of the present disclosure.

FIG. 3 is a flow diagram of a process 50 suitable for starting the arc 24 in the TIG welding system 10 of FIG. 1, in accordance with an embodiment of the present disclosure. The process 50 may be implemented and executed by the subcircuitry 36 of FIG. 2. The process 50 may include obtaining baselines for minimum oscillator on time to start the arc 24 in a welding process performed by the TIG welding system 10 and maximum oscillator off time before the arc 24 extinguishes (process block 52), generating a dithered pseudo-random noise (PRN) pulse train in accordance with the baselines using PWM and PPM (process block 54), and applying the PRN pulse train to the oscillator's state variable during arc starting in the welding process performed by the welding system (process block 56). For example, in certain embodiments, a phase of the oscillator 39 may be altered (e.g., modulated) based at least in part on the generated PRN pulse train. In addition, in certain embodiments, a frequency of the oscillator 39 may be altered (e.g., modulated) based at least in part on the generated PRN pulse train. As previously discussed, regarding process block 52, the baselines that may be used relate to the minimum time the oscillator 39 needs to be on to start the arc 24 and the maximum time the oscillator 39 can be off before the arc 24 extinguishes.

Obtaining the baselines may include accessing the baselines stored in the memory 34 or generating the baselines anew while the power source 12 is operational. Indeed, the baselines may be adapted as the system 10 is used due to normal usage. For example, the minimum amount of time that the oscillator 39 needs to be on to initiate the arc 24 may increase as the electrode 14 quality changes. As such, baselines may be reestablished at any desired time. In some embodiments, the baselines may be determined upon the first arc 24 initiated by the system 10. The baselines may be updated periodically (e.g., every day, week, month, etc.). Also, when the configuration of the electrode 14 changes, the baselines may be reestablished. For example, in certain embodiments, when a new tungsten insert is installed in the torch 16, new baselines may be determined. After the baselines are determined, they may be stored in the memory 34 until they are updated again.

In process block 54, generating the dithered PRN pulse train in accordance with the baselines may include selecting a data sequence such that the oscillator 39 stays on long enough to get the arc 24 started and not off long enough so the arc 24 extinguishes. As noted above, the data may include binary values (logical 1's and 0's) and may be based on the duty cycle. The data sequence may maintain the peak arc power while reducing the average power spectral density. The data sequence may not be completely random because the data sequence is generated within the bounds of the baselines. For example, the data sequence generated may begin with 1's for as long as needed to start the arc 24. Then, the data sequence may select random 1's or 0's according to the baselines. That is, any number of consecutive 1's may be selected for at least the minimum on time and any number of consecutive 0's may be selected less than the maximum off time. Last, when it is desired to extinguish the arc 24, consecutive 0's may be selected for the maximum off time so the arc 24 extinguishes. By randomly selecting values in the dithered PRN pulse train, the pulse widths (e.g., via PWM) and the temporal position of the pulses (e.g., via PPM) are varied, leading to a spread spectrum effect and a reduced average power spectral density. Once the dithered PRN pulse train is generated, it may be applied to the state variable of the oscillator 39 to control the operation of the oscillator 39 accordingly (process block 56).

Figure 4A:
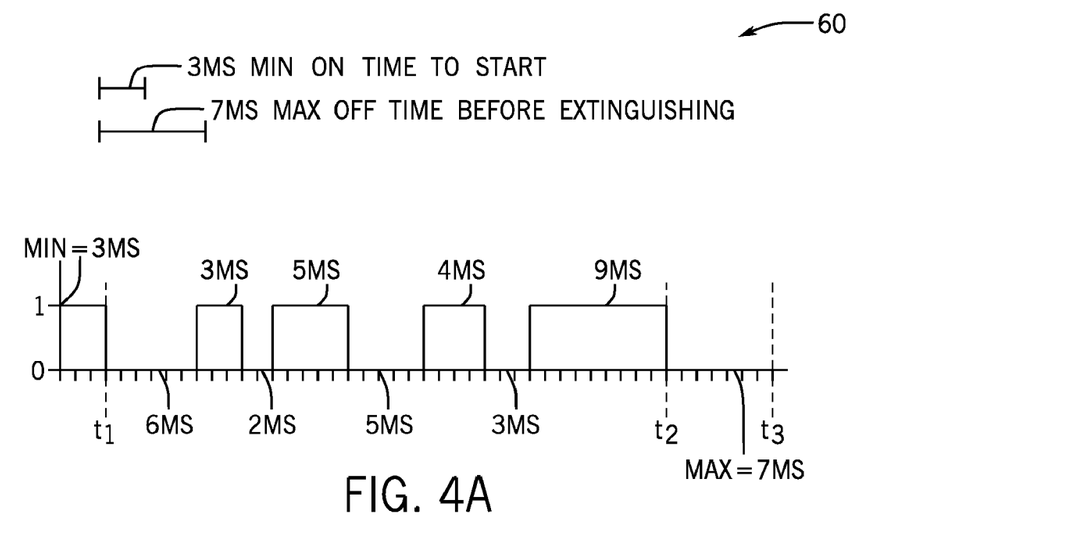
FIG. 4A is an exemplary dithered pulse train including pseudo-random noise (PRN) generated using the circuitry of FIG. 2.
Figure 4B:
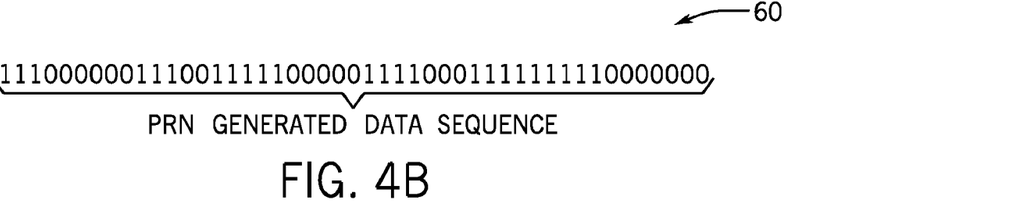
FIG. 4B is the binary representation of the dithered PRN pulse train of FIG. 4A, in accordance with an embodiment of the present disclosure.

FIG. 4A is an exemplary dithered pulse train 60 including pseudo-random noise (PRN) generated using the subcircuitry 36 of FIG. 2, and FIG. 4B is a binary representation of the dithered PRN pulse train 60 of FIG. 4A, in accordance with an embodiment of the present disclosure. Starting with FIG. 4A, as depicted, the generated dithered PRN pulse train 60 adheres to the baselines for the minimum on time and the maximum off time. It should be noted that the time lengths represented are for explanatory purposes and actual lengths and binary values may differ accordingly. For example, in the depicted embodiment, the minimum on time to start the arc 24 is set to 3 milliseconds (ms) and the maximum off time before the arc 24 extinguishes is set to 7 ms. Accordingly, the pulse train 60 begins by setting the state variable to high (logical 1's) for the minimum amount of time needed to start the arc 24 (3 ms). After the arc 24 is started at time $t_1$, the state variable changes randomly between on (logical 1) and off (logical 0) within the bounds of the baselines. Specifically, the state variable is set accordingly:

0 for 6 ms, which is less than the maximum off time of 7 ms 1 for 3 ms, which is the minimum on time baseline 0 for 2 ms, which is less than the maximum off time of 7 ms 1 for 5 ms, which is greater than the minimum on time baseline 1 for 4 ms, which is greater than the minimum on time baseline 0 for 3 ms, which is less than the maximum off time of 7 ms 1 for 9 ms, which is greater than the minimum on time baseline Then, at time $t_2$, when it is desired to extinguish the arc, the state variable is set to 0 for the maximum off time of 7 ms so the arc extinguishes at time $t_3$. The resulting data sequence of binary values for the dithered PRN pulse train 60 is shown in FIG. 4B. For example, the sequence is represented as:

111000000111001111100000111100011111111110000000

As may be seen, the widths of the pulses vary. Indeed, the on times of the pulses equal 3 ms, 3 ms, 5 ms, 4 ms, and 9 ms. Also, the positions of when the pulses activate vary between cycles to spread the frequencies used by the signal. The spread spectrum effect may be further enabled by the non-tuned amplifier 40 and low Q transformer 42 configured to provide broad band operation. The average power may be reduced by randomly varying pulse widths because the output power is averaged between all the pulses instead of kept constant with a high voltage as is done in HF waveform arc starts.

Figure 5:
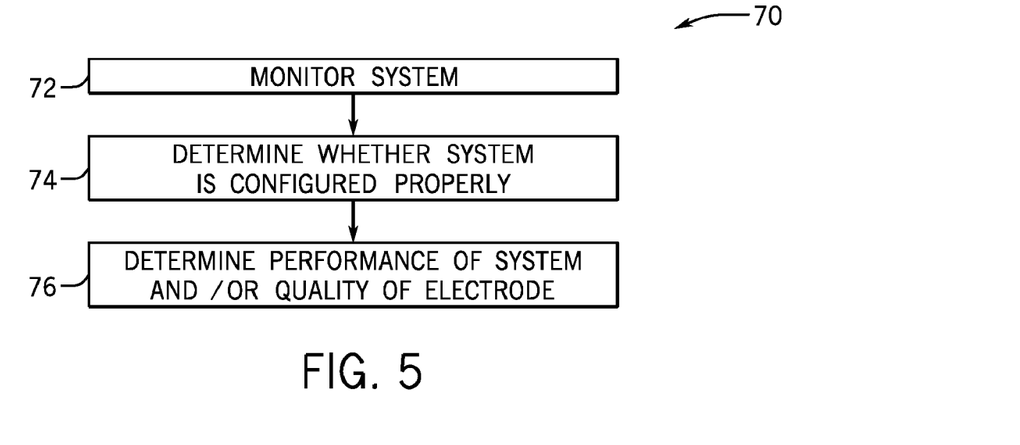
FIG. 5 is a block diagram of a process suitable for monitoring and determining aspects of the TIG welding system of FIG. 1, in accordance with an embodiment of the present disclosure.

FIG. 5 is a block diagram of a process 70 suitable for monitoring and determining aspects of the TIG welding system 10 of FIG. 1, in accordance with an embodiment of the present disclosure. The process 70 may be implemented as computer instructions stored on the one or more memories 34 and executable by the one or more processors 32. The process 70 may include monitoring the system 10 (process block 72), determining whether the system 10 is configured properly (process block 74), and determining the performance of the system 10 and/or quality of the electrode 14 (process block 76). Specifically, in process block 72, monitoring the system 10 may include using the sensors 37 to monitor desired aspects of the welding process. For example, in some embodiments, the sensors 37 may be configured to track the amount of time elapsed to start the arc 24 and the amount of time elapsed to extinguish the arc 24. The sensors 37 may be configured to send the tracked data back to the control and power conversion circuitry 30. In some embodiments, the sensors 37 may detect the voltage and current sent to the torch 16 from the circuitry 30, thermal properties of the electrode 14 (e.g., heat of electrode during operation), and so forth.

Using the data returned from the sensors 37 or data in the possession of the circuitry 30, the processor 32 may determine whether the system 10 is configured properly (process block 72). For example, the type of weld (e.g., TIG) determines how the electrode 14 is pointed and positioned. If the data indicates that the electrode 14 is taking longer than the baseline for the minimum on time to start the arc 24, then the processor 32 may determine that the electrode 14 is not properly positioned. Additionally or alternatively, if the arc 24 starts and then extinguishes before the baseline for the maximum off time, then the processor 32 may determine that the electrode 14 is not pointed properly. In this way, the process 70 may use the baselines to perform self-diagnostics.

In addition, the process 70 may include determining the performance and/or quality of aspects of the system 10 (process block 76). For example, if the current required to initiate the arc 24 increases beyond a set threshold value (e.g. maximum value), the processor 32 may determine that the quality of the electrode 14 is decaying, requiring that the electrode be re-pointed or shaped for the desired weld process. In other words, the processor 32 may determine that the electrode 14 is configured incorrectly based at least in part on whether, for a given oscillator collector/drain current, the time to initiate an arc exceeds a normative time threshold based upon the baselines. As such, the current may be monitored in the circuitry 30 to determine how much voltage is needed to initiate the arc 24. Also, the sensors 37 may monitor the current supplied to the torch 16. In some embodiments, the performance or quality of the electrode 14 may be assessed by one or more electrical characteristics of the subcircuitry 36 such that those characteristics are compared against normative limits of operation.

In any of the above described scenarios with regards to process block 74 and/or process block 76, if the processor 32 determines that there is a configuration issue or quality concern, an alert may be generated via the operator interface 28. As a result, the process 70 may provide notice to the user that the electrode 14 is not configured properly, or needs to be replaced or re-shaped/pointed, for example.

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A welding system, comprising:
 a welding power source configured to be coupled to a welding torch via a weld cable and configured to supply welding power to the welding torch, wherein the welding power source comprises:
  pseudo-random noise (PRN) generator control logic circuitry configured to generate a dithered pulse waveform with a pseudo-randomly selected data sequence; and
  apply the dithered pulse waveform to an oscillator during arc starting in a tungsten inert gas (TIG) welding process performed by the welding torch.

2. The welding system of claim 1, wherein the dithered pulse waveform is generated based at least in part on one or more baselines comprising a minimum on time baseline for the oscillator to start an arc and a maximum off time baseline for the oscillator before an arc extinguishes.

3. The welding system of claim 2, wherein the pseudo-randomly selected data sequence comprises initial binary values set to on for the minimum on time according to the baselines for the oscillator to start the arc, intermediary binary values set to on for random lengths of time greater than the minimum on time baseline and intermediary binary values set to off for random lengths of time less than the maximum off time baseline, and final binary values set to off for the maximum off time according to the baselines.

4. The welding system of claim 1, wherein the dithered pulse waveform reduces an average power spectral density output due to random width pulses and causes a spread frequency spectrum effect due to random temporal positions of pulses of the dithered pulse waveform.

5. The welding system of claim 1, wherein the welding power source comprises a low Q transformer configured to provide broad band operation and to filter frequencies of output power from the welding power source.

6. The welding system of claim 1, wherein the welding power source comprises a non-tuned RF amplifier configured to provide broad band operation.

7. The welding system of claim 6, wherein the non-tuned RF amplifier embodies a high efficiency amplifier topology comprising class C, D, E, or F.

8. A welding system, comprising:
 a welding power source configured to be coupled to a welding torch via a weld cable and configured to supply welding power to the welding torch, wherein the welding power source comprises:
  pseudo-random noise (PRN) generator control logic circuitry configured to generate a pulse waveform with a pseudo-randomly selected data sequence; and
  alter at least one of a frequency or a phase of an oscillator during arc starting in a tungsten inert gas (TIG) welding process performed by the welding torch based at least in part on the pulse waveform.

9. The welding system of claim 8, wherein the pulse waveform reduces an average power spectral density output due to random width pulses and causes a spread frequency spectrum effect due to random temporal positions of pulses of the pulse waveform.

10. The welding system of claim 8, wherein the welding power source comprises a low Q transformer configured to provide broad band operation and to filter frequencies of output power from the welding power source.

11. The welding system of claim 8, wherein the welding power source comprises a non-tuned RF amplifier configured to provide broad band operation.

12. A welding system, comprising:
 a welding power source configured to be coupled to a welding torch via a weld cable and configured to supply welding power to the welding torch, wherein the welding power source comprises:
  pseudo-random noise (PRN) generator control logic circuitry configured to generate at least one of a pulse position modulated (PPM) waveform or a pulse width modulated (PWM) waveform, with a pseudo-randomly selected data sequence of binary values; and
  alter a phase of an oscillator during arc starting in a tungsten inert gas (TIG) welding process performed by the welding torch based at least in part on the PPM waveform.

13. The welding system of claim 12, wherein the PPM waveform reduces an average power spectral density output due to random width pulses and causes a spread frequency spectrum effect due to random temporal positions of pulses of the PPM waveform.

14. The welding system of claim 12, wherein the welding power source comprises a low Q transformer configured to provide broad band operation and to filter frequencies of output power from the welding power source.

15. The welding system of claim 12, wherein the welding power source comprises a non-tuned RF amplifier configured to provide broad band operation.

\* \* \* \* \*